(12) United States Patent
Jung et al.

(10) Patent No.: US 12,237,942 B2
(45) Date of Patent: Feb. 25, 2025

(54) ELECTRONIC DEVICE AND METHOD FOR DETERMINING DEVICE FOR PERFORMING TASK BY ELECTRONIC DEVICE

(71) Applicant: Samsung Electronics Co., Ltd., Suwon-si (KR)

(72) Inventors: Rami Jung, Suwon-si (KR); Hyukjoong Kim, Suwon-si (KR); Daedong Park, Suwon-si (KR); Kyusung Sim, Suwon-si (KR); Kyeonghun Lee, Suwon-si (KR); Keuncheol Lee, Suwon-si (KR); Junsik Jeong, Suwon-si (KR); Jaehong Jo, Suwon-si (KR); Jaehyun Cho, Suwon-si (KR); Woojei Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 266 days.

(21) Appl. No.: 17/290,620

(22) PCT Filed: Apr. 29, 2021

(86) PCT No.: PCT/KR2021/005458
§ 371 (c)(1),
(2) Date: Apr. 30, 2021

(87) PCT Pub. No.: WO2022/092458
PCT Pub. Date: May 5, 2022

(65) Prior Publication Data
US 2022/0311636 A1    Sep. 29, 2022

(30) Foreign Application Priority Data

Oct. 29, 2020  (KR) .................. 10-2020-0141858

(51) Int. Cl.
*H04L 12/28* (2006.01)

(52) U.S. Cl.
CPC ...... *H04L 12/2823* (2013.01); *H04L 12/2816* (2013.01)

(58) Field of Classification Search
CPC ............ H04L 12/2827; H04L 12/2812; H04L 12/282; H04L 2012/285; H04L 12/2829; H04M 11/00; H04Q 9/00
See application file for complete search history.

(56) References Cited

U.S. PATENT DOCUMENTS 8,471,676 B1  6/2013  Lizaso
8,682,284 B2  3/2014  Brackett et al.
(Continued)

FOREIGN PATENT DOCUMENTS

CN    110286601 A    9/2019
JP    2005-072764 A  3/2005
(Continued)

OTHER PUBLICATIONS

International Search Report with Written Opinion dated Aug. 6, 2021; International Appln. No. PCT/KR2021/005458.

*Primary Examiner* — Charles R Kasenge
(74) *Attorney, Agent, or Firm* — Jefferson IP Law, LLP

(57) ABSTRACT

An electronic device is provided. The electronic device includes a communication module, a memory, and a processor configured to obtain first information for performing a task, identify a first task corresponding to the first information, identify a first device meeting a plurality of conditions corresponding to the first task among a plurality of devices, and request the first device to perform the first task via the communication module. Various other embodiments may be provided.

16 Claims, 10 Drawing Sheets

(56) References Cited

U.S. PATENT DOCUMENTS

| | | | |
|---|---|---|---|
| 9,014,736 B2 | 4/2015 | Hart | |
| 9,058,096 B2 | 6/2015 | Kasten et al. | |
| 9,083,817 B2 | 7/2015 | Jan et al. | |
| 9,559,853 B2 | 1/2017 | Sato et al. | |
| 9,661,068 B2 | 5/2017 | Rottler et al. | |
| 9,853,719 B2 | 12/2017 | Krochmal et al. | |
| 9,864,552 B2 | 1/2018 | Kimura | |
| 10,018,975 B2 | 7/2018 | Joo et al. | |
| 10,140,147 B2 | 11/2018 | Stephens | |
| 10,142,375 B2 | 11/2018 | Ho | |
| 10,200,814 B1 | 2/2019 | Zhang et al. | |
| 10,380,208 B1 | 8/2019 | Brahmbhatt et al. | |
| 10,425,459 B2 | 9/2019 | Rider et al. | |
| 10,455,029 B2 | 10/2019 | Jablonski | |
| 10,476,686 B2 | 11/2019 | Sato et al. | |
| 10,567,909 B2 | 2/2020 | Singh | |
| 10,608,993 B2 | 3/2020 | Bansal et al. | |
| 2005/0091302 A1 | 4/2005 | Soin et al. | |
| 2006/0242586 A1 | 10/2006 | McGlinchey et al. | |
| 2014/0003820 A1 | 1/2014 | Lee et al. | |
| 2014/0167931 A1 | 6/2014 | Lee et al. | |
| 2014/0282740 A1 | 9/2014 | Jung et al. | |
| 2016/0119410 A1 | 4/2016 | Ahn et al. | |
| 2016/0124404 A1 | 5/2016 | Oh et al. | |
| 2016/0173937 A1* | 6/2016 | Shih | H04N 21/4363 725/81 |
| 2017/0033944 A1* | 2/2017 | Nadathur | H04L 69/40 |
| 2018/0234637 A1* | 8/2018 | Marino | H04N 5/63 |
| 2018/0286346 A1* | 10/2018 | Castano | H04N 21/42204 |
| 2019/0044745 A1* | 2/2019 | Knudson | H04W 4/029 |
| 2019/0066670 A1 | 2/2019 | White et al. | |
| 2019/0074015 A1 | 3/2019 | Orr et al. | |
| 2020/0145244 A1* | 5/2020 | Hollinger | H04L 12/2809 |
| 2020/0218567 A1 | 7/2020 | Kim et al. | |
| 2020/0302925 A1* | 9/2020 | Shah | G10L 15/22 |
| 2021/0250395 A1* | 8/2021 | VanBlon | H04L 65/60 |
| 2022/0172722 A1 | 6/2022 | Kim et al. | |

FOREIGN PATENT DOCUMENTS

| | | |
|---|---|---|
| JP | 2016-114744 A | 6/2016 |
| KR | 10-2005-0039662 A | 4/2005 |
| KR | 10-2006-0111240 A | 10/2006 |
| KR | 10-2012-0113834 A | 10/2012 |
| KR | 10-2013-0040157 A | 4/2013 |
| KR | 10-1284489 B1 | 7/2013 |
| KR | 10-2014-0002417 A | 1/2014 |
| KR | 10-2016-0048539 A | 5/2016 |
| KR | 10-2016-0053676 A | 5/2016 |
| KR | 10-1993207 B1 | 9/2019 |
| KR | 10-2071185 B1 | 1/2020 |
| KR | 10-2020-0042449 A | 4/2020 |
| KR | 10-2020-0084707 A | 7/2020 |
| WO | 2021/060728 A1 | 4/2021 |

\* cited by examiner

ELECTRONIC DEVICE AND METHOD FOR DETERMINING DEVICE FOR PERFORMING TASK BY ELECTRONIC DEVICE

CROSS-REFERENCE TO RELATED APPLICATION(S)

This application is a National Phase Entry of PCT International Application No. PCT/KR2021/005458, which was filed on Apr. 29, 2021, and claims priority to Korean Patent Application No. 10-2020-0141858, which was filed on Oct. 29, 2020, the contents of which are incorporated herein by reference.

TECHNICAL FIELD

The disclosure relates to an electronic device for determining the optimal device for performing a task corresponding to a user utterance among a plurality of devices and a method for determining a device for performing a task by the electronic device.

BACKGROUND ART

The Internet of things (IoT) refers to a technology in which various devices with built-in sensors and communication functions are connected to the Internet and may provide the function of monitoring and controlling each of various devices connected through the Internet.

The above information is presented as background information only to assist with an understanding of the disclosure. No determination has been made, and no assertion is made, as to whether any of the above might be applicable as prior art with regard to the disclosure.

DISCLOSURE

Technical Problem

Home IoT is used to simply monitor or control individual devices.

To use various devices in the home via a voice service, the user needs to designate a specific device for performing the service, as well as what is to be performed in the service.

Although various devices in the home include a device capable of performing the service better than the specific device designated by the user, the service requested by the user may be carried out only via the specific device designated by the user.

Aspects of the disclosure are to address at least the above-mentioned problems and/or disadvantages and to provide at least the advantages described below. Accordingly, an aspect of the disclosure is to provide an electronic device for determining the optimal device for performing a task corresponding to a user utterance among a plurality of devices and a method for determining a device for performing a task by the electronic device.

Another aspect of the disclosure is to provide an electronic device for providing a home modeling service by compiling contexts gathered in the home and a method for determining a device for performing a task by the electronic device.

Another aspect of the disclosure is to provide an electronic device that may determine the overall state of the home and provide the optimal service in a home multi-modality environment to thereby increase user convenience and a method for determining a device for performing a task by the electronic device.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a communication module, a memory, and a processor configured to obtain and analyze a user utterance, obtain first information for performing a task, identify a first task corresponding to the first information, identify a first device meeting a plurality of conditions corresponding to the first task among a plurality of devices, and requesting the first device to perform the first task via the communication module.

In accordance with another aspect of the disclosure, a method for determining a device for performing a task by an electronic device is provided. The method includes obtaining first information for performing the task, identifying a first task corresponding to the first information, identifying a first device meeting a plurality of conditions corresponding to the first task among a plurality of devices, and requesting the first device to perform the first task via a communication module of the electronic device.

Advantageous Effects

According to the embodiments, an electronic device may determine the optimal device capable of performing a requested service among various devices in the home and enable the optimal device to perform the service requested by the user. The electronic device may determine an additional device to allow the user to conveniently control the optimal device performing the service corresponding to the request and to conveniently control the optimal device using the additional device. The electronic device may continuously provide the user with a service by determining a device capable of performing the service among various devices in the home.

The electronic device may provide a home modeling service by compiling contexts gathered in the home, determine the overall state of the home, and provide the optimal service in the home multi-modality environment, thereby increasing user convenience.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which.

MODE FOR DISCLOSURE

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
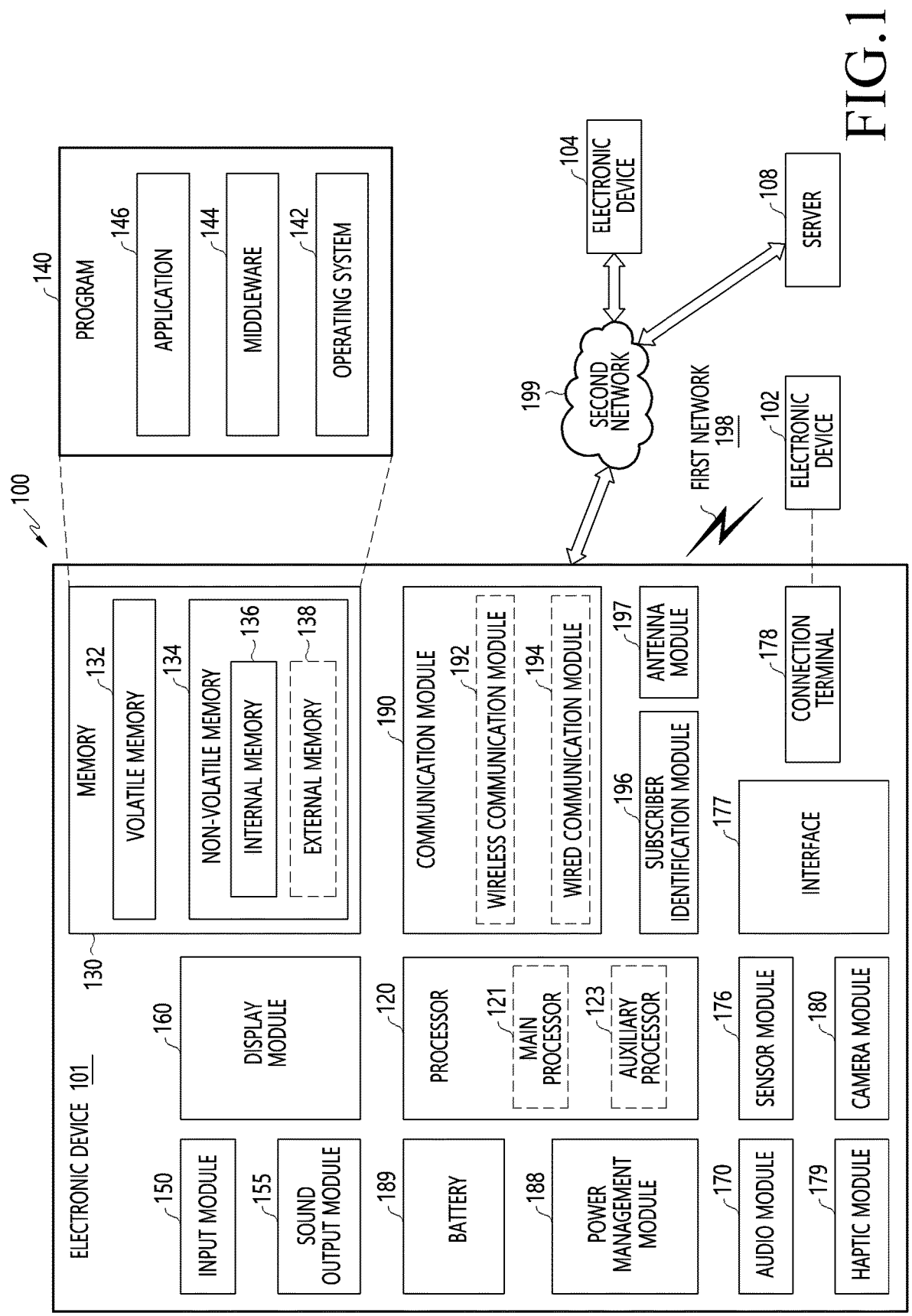
FIG. 1 is a view illustrating an electronic device in a network environment according to an embodiment of the disclosure.

FIG. 1 is a block diagram illustrating an electronic device in a network environment according to an embodiments of the disclosure. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. At least one (e.g., the connecting terminal 178) of the components may be omitted from the electronic device 101, or one or more other components may be added in the electronic device 101. Some of the components (e.g., the sensor module 176, the camera module 180, or the antenna module 197) may be integrated into a single component (e.g., the display module 160).

The processor 120 may execute software (e.g., a program 140) to control at least one other component (e.g., a hardware or software component) of the electronic device 101 coupled with the processor 120, and may perform various data processing or computation. As at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an image signal processor or a communication processor) may be implemented as part of another component (e.g., the camera module 180 or the communication module 190) functionally related to the auxiliary processor 123. The auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include software (e.g., the program 140) and input data or output data for a command related thereto. The memory 130 may include the volatile memory 132 or the non-volatile memory 134.

The program 140 may be stored in the memory 130 as software, and may include an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include a microphone, a mouse, a keyboard, keys (e.g., buttons), or a digital pen (e.g., a stylus pen).

The sound output module 155 may output sound signals to the outside of the electronic device 101. The sound output module 155 may include a speaker or a receiver. The speaker may be used for general purposes, such as playing multimedia or playing record. The receiver may be used for receiving incoming calls. The receiver may be implemented as separate from, or as part of the speaker.

The display module 160 may visually provide information to the outside (e.g., a user) of the electronic device 101. The display 160 may include a display, a hologram device, or a projector and control circuitry to control a corresponding one of the display, hologram device, and projector. The display 160 may include a touch sensor configured to detect a touch, or a pressure sensor configured to measure the intensity of a force generated by the touch.

The audio module 170 may convert a sound into an electrical signal and vice versa. The audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). The connecting terminal 178 may include a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. The haptic module 179 may include a motor, a piezoelectric element, or an electric stimulator.

The camera module 180 may capture a still image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, Wi-Fi direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter (mm) Wave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). The wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). The antenna module 197 may include one antenna including a radiator formed of a conductor or conductive pattern formed on a substrate (e.g., a printed circuit board (PCB)). The antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. In addition to the radiator, the antenna module 197 may include other components, such as a radio frequency integrated circuit (RFIC).

The antenna module 197 may form a mmWave antenna module. The mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. The external electronic devices 102 or 104 each may be a device of the same or a different type from the electronic device 101. All or some of the operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2:
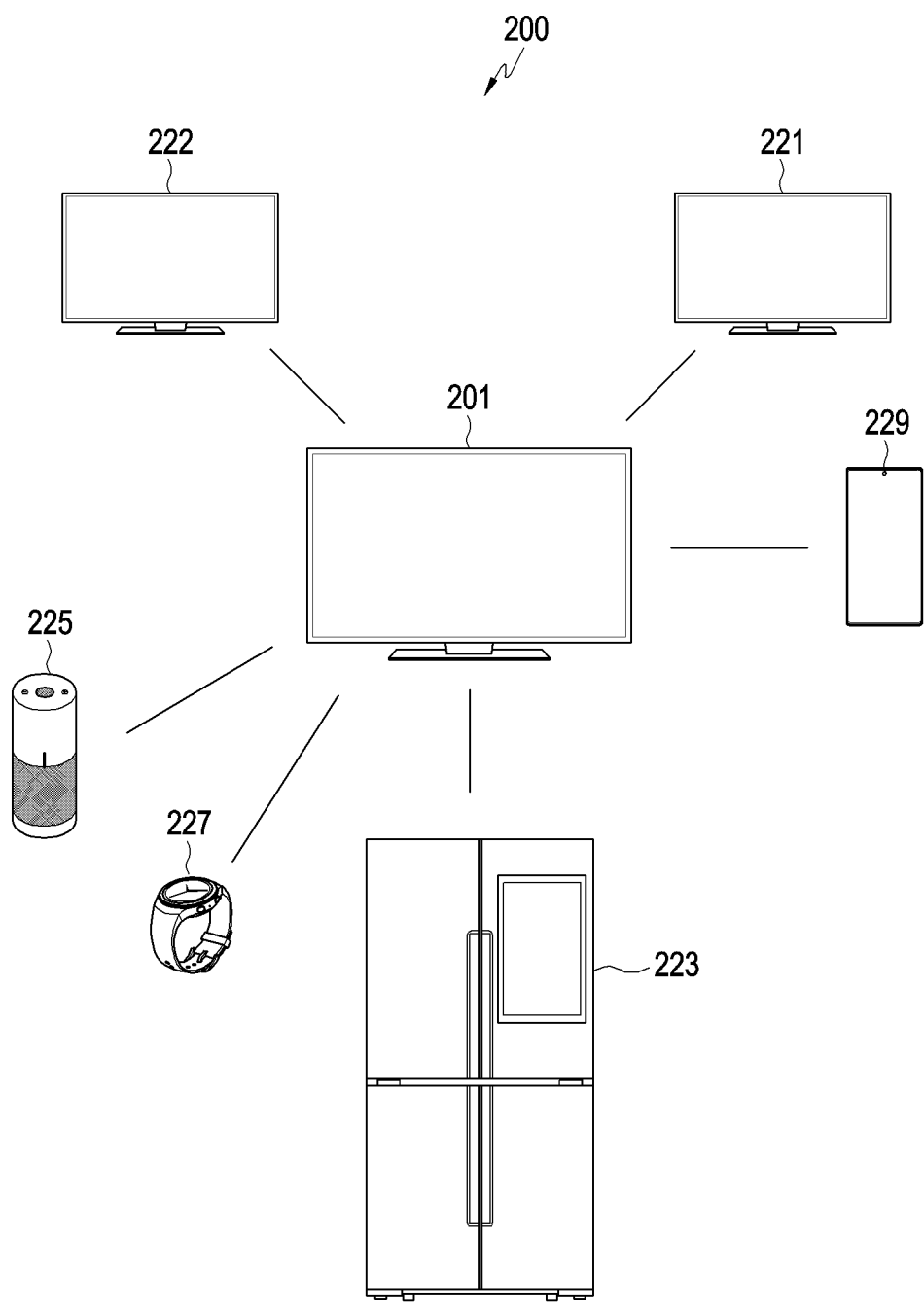
FIG. 2 is a view illustrating the operation of controlling a plurality of devices in a home by an electronic device according to an embodiment of the disclosure.

FIG. 2 is a view 200 illustrating operations for controlling a plurality of devices in a home by an electronic device according to an embodiment of the disclosure.

Referring to FIG. 2, a home may include a plurality of devices 221 to 229 and an electronic device 201 capable of managing the plurality of devices 221 to 229.

The electronic device 201 may be a primary device capable of performing a home IoT edge function, and the electronic device 201 may manage the plurality of devices while transmitting and receiving information to/from each of the plurality of devices 221 to 229, with communication established with the plurality of devices 221 to 229.

The electronic device 201 and the plurality of devices 221 to 229 may include all or some of the components of the electronic device 101 of FIG. 1.

At least one of the plurality of devices 221 to 229 may be set as a primary device capable of performing a home IoT edge function.

At least one non-portable device (e.g., TV devices 201, 221, and 222, a refrigerator 223, and an artificial intelligence (AI) speaker 225) among various devices 201 and 221 to 229 in the home may be set as the primary device capable of performing a home IoT edge function.

The electronic device 201 may receive device information from each of the plurality of devices 221 to 229 and store the device information.

The device information may include device configuration information (e.g., display information, speaker information, microphone information, and voice service support information) and device state information (e.g., power on/off information, information about the function being currently performed, and location information).

Upon receiving first information for performing a task, the electronic device 201 may identify a first task corresponding to the first information, determine a first device capable of performing the first task based on a plurality of conditions corresponding to the first task and the device information about each of the plurality of devices 221 to 229, and request the first device to perform the first task.

Upon receiving state information according to performing the first task from the first device, the electronic device 201 may identify a second task for the first device, determine a second device capable of performing the second task among the plurality of devices 221 to 229 based on a plurality of conditions corresponding to the second task and the state information about the first device, and request the second device to perform the second task.

One of portable devices among the plurality of devices 221 to 229, such as a watch phone 227 or a smartphone 229, may be set as the second device.

Figure 3:
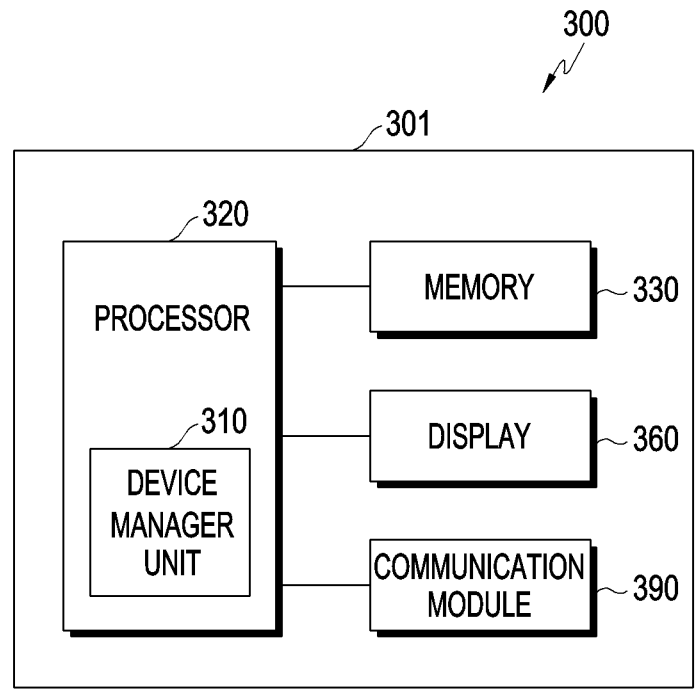
FIG. 3 is a block diagram illustrating an electronic device according to an embodiment of the disclosure.

FIG. 3 is a block diagram 300 illustrating an electronic device according to an embodiment of the disclosure.

Referring to FIG. 3, an electronic device 301 (e.g., the electronic device 101 of FIG. 1) may include a processor 320 (e.g., the processor 120 of FIG. 1), a memory 330 (e.g., the memory 130 of FIG. 1), a display 360 (e.g., the display module 160 of FIG. 1), and a communication module 390 (e.g., the communication module of FIG. 1).

The processor 320 may control the overall operation of the electronic device 301. The processor 320 may include a device manager unit 310 that may manage a plurality of devices (e.g., the plurality of devices 221 to 229 of FIG. 2) by the electronic device 301, determine an optimal first device capable of performing a first task corresponding to first information for performing a task among the plurality of devices, and determine a second device capable of performing a second task for the first device.

The device manager unit 310 may be included in the processor 320 or be configured as a separate component.

The processor 320 (e.g., the device manager unit 310) may obtain and analyze first information for performing a task and identify the first task based on the analyzed first information.

According to an embodiment, the processor 320 may obtain user utterance information and, upon identifying that the obtained user utterance information is the first information, identify the first task corresponding to the user utterance information.

For example, the processor 320 may identify that the user utterance information, e.g., "Direct me to a Chinese restaurant," is the first information and identify the first task (e.g., navigation).

The processor 320 may obtain state change information about a device in the home, identify that the obtained state change information about the device in the home is the first information, and identify the first task corresponding to the state change information about the device in the home. For example, the processor 320 may identify that a state change of an air conditioner device from an off state to an on state is the first information and identify the first task (e.g., providing weather information) corresponding to the first information, i.e., the state change of the air conditioner device.

The processor 320 may obtain preset specific time information, identify that the specific time information is the first information, and identify the first task corresponding to the specific time information. For example, the processor 320 may identify that 2 PM every Monday as preset is the first information and identify the first task (e.g., viewing a TV show) corresponding to the first information, i.e., the specific time information.

The processor 320 may obtain state change information about the home, identify that the obtained state change information about the home is the first information, and identify the first task corresponding to the state change information about the home. For example, the processor 320 may obtain state change information (e.g., changes in temperature, humidity, and light intensity by a reference value or more or less) about the home based on sensor information gathered via at least one sensor mounted on the plurality of devices in the home or at least separate sensor provided in the home, identify that the obtained state change information about the home is the first information, and identify the first task (e.g., outputting the information about the current change in the temperature, humidity, or light intensity of the home) corresponding to the first information, i.e., the home state change information.

The processor 320 may obtain location information about the user in the home and identify that the obtained user location information is the first information. For example, upon identifying that the user enters a specific one of a plurality of rooms in the home, the processor 320 may identify that the location information about the user in the specific room is the first information and identify the first task (e.g., outputting schedule information for the user) corresponding to the first information, i.e., the location information about the user in the home.

The processor 320 (e.g., the device manager unit 310) may gather device information received from each of the plurality of devices (e.g., the plurality of devices 221 to 229 of FIG. 2) in the home, managed by the electronic device 301, and store the device information in the memory 330.

The processor 320 (e.g., the device manager unit 310) may gather the device information (e.g., device configuration information and device state information) received from each of the plurality of devices (e.g., the plurality of devices 221 to 229) as shown in Table 1 below and store the device information in the memory 330.

TABLE 1

| Device type | Device name | Display resolution information (display resolution) | Volume information (max decibel) | Voice service Support information (Bixby) | Power state Information (power) | User's current activity information |
|---|---|---|---|---|---|---|
| device A(221) | my TV1 | FHD | 100 | enable | off | — |
| device B(222) | my TV2 | HD | 90 | — | on | — |
| device C(223) | my Fridge | WVGA | — | — | — | — |
| device D(225) | my speaker | — | 95 | enable | on | — |
| device E(227) | my watch | VGA | 10 | disable | on | 5 (running) |
| device F(229) | my phone | HD | 95 | enable | on | 1 (idle) |

As shown in Table 1, the device information about the plurality of devices (device A to device F) may include device configuration information and device state information. The device configuration information may include necessary configuration information that is not changed, such as display resolution, volume information, and voice service support information. The device state information may include information that may vary depending on the context of the device, such as power state information and user activity information. The user activity information indicates information that may be obtained by the device (e.g., device E and device F) that is held by the user or may be worn. Table 1 above is merely an example of the device information; the device information about the plurality of devices may include various information, such as location information and information about the task being currently performed.

The processor 320 (e.g., the device manager unit 310) may identify the first task based on the first information for performing a task and identify the type of the first task.

The processor 320 (e.g., the device manager unit 310) may identify a plurality of conditions corresponding to the first task among a plurality of conditions set per type of task.

The plurality of conditions set per type of task may include a first condition for device configuration information for performing the task, a second condition for the device state information for performing the task, and third condition (information) for the number of devices for performing the task. The first to third conditions may be sequentially applied. The first condition may denote a constraint condition that needs to necessarily be included, the second condition may denote a preference condition for selecting more suitable device for performing the task, and the third condition may denote the number of devices selected from among the plurality of devices.

The processor 320 (e.g., the device manager unit 310) may identify a plurality of conditions corresponding to the first task among a plurality of conditions set per type of task. The processor 320 may determine first candidate devices that meet the first condition for performing the first task among the plurality of devices (e.g., the plurality of devices 221 to 229 of FIG. 2). The processor 320 may determine second candidate devices that meet the second condition for performing the first task among the first candidate devices and determine the first device that meets the third condition for performing the first task among the second candidate devices.

For example, upon obtaining a user utterance, "Direct me to a nearby Chinese restaurant," as the first information for performing the task, the processor 320 may identify that the first task is of the type of task for "navigation." The processor 320 may identify a plurality of conditions corresponding to the first task for "navigation," e.g., a first condition where the context of "power" exists, a second condition where the maximum volume is preferred, and a third condition where the number of devices for performing the first task is one, among the plurality of conditions set per type of task. The processor 320 may determine first candidate devices (e.g., devices A, B, D, E, and F) that meet the first condition which has the context of "power" among the plurality of devices (e.g., devices A to F) based on Table 1 above. The processor 320 may sort the first candidate devices (e.g., devices A, B, D, E, and F) in order from the highest volume to the lowest volume and determine second candidate devices (e.g., device A>device D=device F>device B>device E) that meet the second condition. As the second candidate device (e.g., device A) meeting the second condition meets the third condition where the number of devices for performing the first task is one, the processor 320 may determine that device A is the first device for performing the first task.

T processor 320 (e.g., the device manager unit 310) may previously register a method in which each of the plurality of devices (e.g., the plurality of devices 221 to 229 of FIG. 2) may perform a task according to the type of the task. For example, the processor 320 may previously register a method in which the plurality of devices (e.g., the plurality of devices 221 to 229 of FIG. 2) may perform a task, e.g., "navigation," as shown in Table 2 below.

TABLE 2

| | Method for performing the task of "navigation" |
|---|---|
| Device A (221) | guide via audio and screen |
| Device B (222) | guide via audio and screen |
| Device C (225) | guide via screen |
| Device B (229) | guide via audio |

Upon determining a first device capable of performing the first task among the plurality of devices (e.g., the plurality of devices 221 to 229 of FIG. 2), the processor 320 (e.g., the device manager unit 310) may request the first device to perform the first task. Upon performing the first task using an audio and screen by the first device (e.g., device A) and receiving state information indicating that the first task is performed from the first device, the processor 320 (e.g., the device manager unit 310) may gather the state information as device information and store the device information in the memory 330.

After requesting the first device to perform the first task corresponding to the first information for performing a task, the processor 320 (e.g., the device manager unit 310) may determine whether to perform a second task for the first device.

Upon receiving the state information indicating that the first task is performed from the first device, the processor 320 (e.g., the device manager unit 310) may determine whether to perform the second task and identify the second task for the first device depending on the determination as to whether to perform the second task. The processor 320 (e.g., the device manager unit 310) may identify a plurality of conditions (e.g., the first to third conditions) for determining whether to perform the second task, and determine to perform the second task when all or at least some of the plurality of conditions are met. The processor 320 may determine to perform the second task when, among the plurality of conditions, the first condition where the first task corresponding to the first information for performing a task is irrelevant to the termination of a function of the first device (e.g., a user utterance to request to terminate the function of the first device) is met. The processor 320 may determine to perform the second task when, among the plurality of conditions, the second condition where the number of functions (e.g., a display function, speaker function, or voice support function) that may be performed by the first device is a predetermined number or more based on the configuration information about the first device is met. The processor 320 may determine to perform the second task when among the plurality of conditions, the third condition where the first device is a non-portable device is met.

Upon determining to perform the second task, the processor 320 (e.g., the device manager unit 310) may identify a second task for performing an additional service for the first task performed by the first device and/or a second task for controlling the function of the first device.

Upon determining to perform the second task for the first device after requesting the first device to perform the first task corresponding to the first information for performing a task, the processor 320 (e.g., the device manager unit 310) may determine the second device to perform the first task. The processor 320 (e.g., the device manager unit 310) may identify a plurality of conditions corresponding to the second task among a plurality of conditions set per type of task.

The processor 320 (e.g., the device manager unit 310) may identify a plurality of conditions corresponding to the second task among a plurality of conditions set per type of task. The processor 320 may determine first candidate devices that meet the first condition for performing the second task among the plurality of devices (e.g., the plurality of devices 221 to 229 of FIG. 2). The processor 320 may determine second candidate devices that meet the second condition for performing the second task among the first candidate devices and determine the second device that meets the third condition for performing the second task among the second candidate devices.

For example, upon receiving state information indicating that the first task (e.g., directing to a nearby Chinese restaurant) is performed from the first device (e.g., device A 221 or a TV device), the processor 320 (e.g., the device manager unit 310) may identify a second task for displaying menu information (e.g., menu information for an additional search for nearby Chinese restaurants) for performing an additional service for the first task performed by the first device and/or a second task for displaying menu information (e.g., a TV remote controller menu) for controlling the function (e.g., the TV function of device A) of the first device. The processor 320 may identify a first condition where the context of display exists, and user activity information is included, a second condition where the user activity information indicates a lowest level, and a third condition where the number of devices for performing the second task is one, among the plurality of conditions corresponding to the second task. The processor 320 may determine first candidate devices (e.g., devices F and E) which are portable devices meeting the first condition where the context of display exists and user activity information is included among the plurality of devices (devices A to F) based on Table 1 above. The processor 320 may determine device F (e.g., the smartphone 229) meeting the second condition where the user activity information indicates a lowest level and the third condition where the number of devices for performing the second task is one, as the second device for performing the second task.

The processor 320 (e.g., the device manager unit 310) may request the second device to perform the second task, gather state information indicating that the second task is performed, received from the second device, as device information, and store the device information in the memory 330.

The processor 320 (e.g., the device manager unit 310) may previously register a method in which each of portable devices (e.g., devices E and F) among the plurality of devices (e.g., the plurality of devices 221 to 229 of FIG. 2) may perform the second task according to the type of non-portable devices (e.g., devices A to D) as shown in Table 3 below.

TABLE 3

| Portable devices capable of performing second task | Non-portable devices capable of performing first task | Method for performing second task |
|---|---|---|
| device E (227) | device A | display menu information for performing second task by device A |
| | device B | -[No registered action] |
| | device C | display menu information for performing second task by device C |
| | device D | display menu information for performing second task by device D |
| device F (223) | device A | display menu information and activate voice service to perform second task by device A |
| | device B | display menu information and activate voice service to perform second task by device B |
| | device C | display menu information and activate voice service to perform second task by device C |
| | device D | display menu information and activate voice service to perform second task by device D |

Upon receiving information about another device, as changed, for performing the first task from the second device that has been requested to perform the second task, the processor 320 (e.g., the device manager unit 310) may request the other device, among the plurality of devices (e.g., the plurality of devices 221 to 229 of FIG. 2), to perform the first task. Upon receiving information about another device selected by the user from the second device capable of providing a service for changing the device for performing the first task, the processor 320 (e.g., the device manager unit 310) may request the first device to terminate performing the first task and request the other device to perform the first task. The processor 320 may request the second device to perform the second task for the other device. For example, the processor 320 may request the first device (e.g., a TV device) to perform the first task and request the second device (e.g., a smartphone) to perform the second task (e.g., display a remote controller menu for controlling the TV) for the first device. Upon receiving information about another device (e.g., a refrigerator) selected by the user from the second device that may provide a service for changing the device for performing the first task, the processor 320 may request the first device (e.g., a TV device) to terminate performing the first task and request the other device (e.g., a refrigerator) to perform the first task. The processor 320 may request the second device (e.g., a smartphone) to perform the second task (e.g., display a remote controller menu for controlling the refrigerator) for the other device (e.g., a refrigerator).

The memory 330 may store the device information gathered by and received from the plurality of devices (e.g., the plurality of devices 221 to 229 of FIG. 2) in the home, which are managed by the electronic device 301 (e.g., the electronic device 201 of FIG. 2).

The memory 330 may store device information gathered by and received from the plurality of devices (e.g., the plurality of devices 221 to 229 of FIG. 2) as shown in Table 1 above.

The memory 330 may store a previously registered method in which the plurality of devices (e.g., the plurality of devices 221 to 229 of FIG. 2) may perform a task according to the type of the task as shown in Table 2 above.

The memory 330 may store a previously registered method in which portable devices (e.g., devices E and F) among the plurality of devices (e.g., the plurality of devices 221 to 229 of FIG. 2) may perform the second task according to the type of non-portable devices (e.g., devices A to D) as shown in Table 3 above.

The memory 330 may store a plurality of conditions set per type of task.

The display 360 may display the function being currently performed by the electronic device 301 under the control of the processor 320.

The display 360 may display information about the first device determined to perform the first task corresponding to the first information for performing a task among the plurality of devices (e.g., the plurality of devices 221 to 229 of FIG. 2) and/or information about the second device determined to perform the second task for the first device.

The communication module 390 may include a plurality of communication circuits using different communication technologies.

The communication module 390 may include a mobile communication module (not shown) or a sub communication module (not shown) performing short-range communication with a wireless LAN. The communication module 390 may perform communication with an external device using at least one antenna (not shown) under the control of the processor 320.

The communication module 390 may include at least one of a wireless LAN module (not shown) and a short-range communication module (not shown) and may include a near-field communication (NFC) communication module, Bluetooth legacy communication module, and/or a Bluetooth low energy (BLE) communication module as the short-range communication module.

Figure 4:
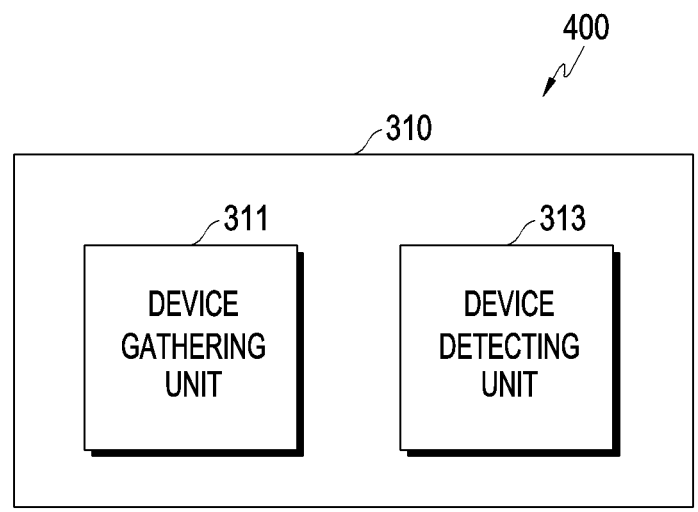
FIG. 4 is a block diagram illustrating a device manager unit of an electronic device according to an embodiment of the disclosure.

FIG. 4 is a block diagram 400 illustrating a device manager unit of an electronic device according to an embodiment of the disclosure.

Referring to FIG. 4, a device manager unit 310 may include a device gathering unit 311 and a device detecting unit 313.

The device gathering unit 311 may gather device information about each of a plurality of devices (e.g., the plurality of devices 221 to 229 of FIG. 2) in the home, managed by an electronic device (e.g., the electronic device 201 of FIG. 2 and/or the electronic device 301 of FIG. 3).

The device gathering unit 311 may gather and store the device configuration information received from each of the plurality of devices when each of the plurality of devices is connected to the electronic device.

The device gathering unit 311 may gather and store the device state information received from each of the plurality of devices whenever state information about each of the plurality of devices is changed.

The device gathering unit 311 may gather and store the device information about each of the plurality of devices as shown in Table 1 above.

The device gathering unit 311 may provide the device information gathered from each of the plurality of devices to the device detecting unit 313.

The device detecting unit 313 may identify a first task corresponding to first information for performing a task, identify a first device to perform the first task among a plurality of devices (e.g., the plurality of devices 221 to 229 of FIG. 2), identify a second task for the first device, and determine a second device to perform the second task among the plurality of devices.

Upon obtaining a user utterance as the first information, the device detecting unit 313 may parse and analyze the user utterance and identify the first task based on the information analyzed for the user utterance.

The device detecting unit 313 may identify a plurality of conditions corresponding to the first task among a plurality of conditions set per type of task, determine the first device meeting the plurality of conditions corresponding to the first task among the plurality of devices, and request the first device to perform the first task.

The device detecting unit 313 may identify the second task for the first device performing the first task, identify a plurality of conditions corresponding to the second task among the plurality of conditions set per type of task, determine the second device meeting the plurality of conditions corresponding to the second task among the plurality of devices, and request the second device to perform the second task.

According to an embodiment of the disclosure, an electronic device (e.g., the electronic device 101 of FIG. 1, the electronic device 201 of FIG. 2, the electronic device 301 of FIG. 3, or the electronic device 501 of FIG. 5) may comprise a communication module (e.g., the communication module 390 of FIG. 3), a memory (e.g., the memory 330 of FIG. 3), and a processor (e.g., the processor 122 of FIG. 1 or the processor 320 of FIG. 3) configured to obtain first information for performing a task, identify a first task corresponding to the first information, identify a first device meeting a plurality of conditions corresponding to the first task among a plurality of devices, and request the first device to perform the first task via the communication module.

The processor may be configured to store device information gathered from the plurality of devices in the memory.

The processor may be configured to identify a plurality of conditions corresponding to the first task among a plurality of conditions set per type of task and determine the first device meeting the plurality of conditions corresponding to the first task among the plurality of devices based on device information gathered from the plurality of devices stored in the memory.

The processor may be configured to identify first candidate devices meeting a first condition indicating a constraint condition for device configuration information for performing the first task among the plurality of devices, identify second candidate devices meeting a second condition indicating a preference condition for device state information for performing the first task among the first candidate devices, and identify the first device meeting a third condition for information about a number of devices for performing the first task among the second candidate devices.

The processor may be configured to gather state information indicating that the first task is performed, received from the first device, as device information and store the device information in the memory.

The processor may be configured to identify a second task for the first device, identify a second device meeting a plurality of conditions corresponding to the second task among the plurality of devices, and request the second device to perform the second task via the communication module.

The processor may be configured to identify the second task for performing an additional service for the first task performed by the first device or the second task for controlling a function of the first device.

The processor may be configured to identify the second device meeting the plurality of conditions corresponding to the second task among the plurality of devices based on device information gathered from the plurality of devices stored in the memory of the electronic device.

The processor may be configured to identify first candidate devices meeting a first condition for user activity information and device configuration information for performing the second task among the plurality of devices, identify second candidate devices meeting a second condition for device state information for performing the second task among the first candidate devices, and identify the second device meeting a third condition for information about a number of devices for performing the second task among the second candidate devices.

The processor may be configured to gather state information indicating that the second task is performed, received from the second device, as device information and store the device information in the memory of the electronic device.

Figure 5:
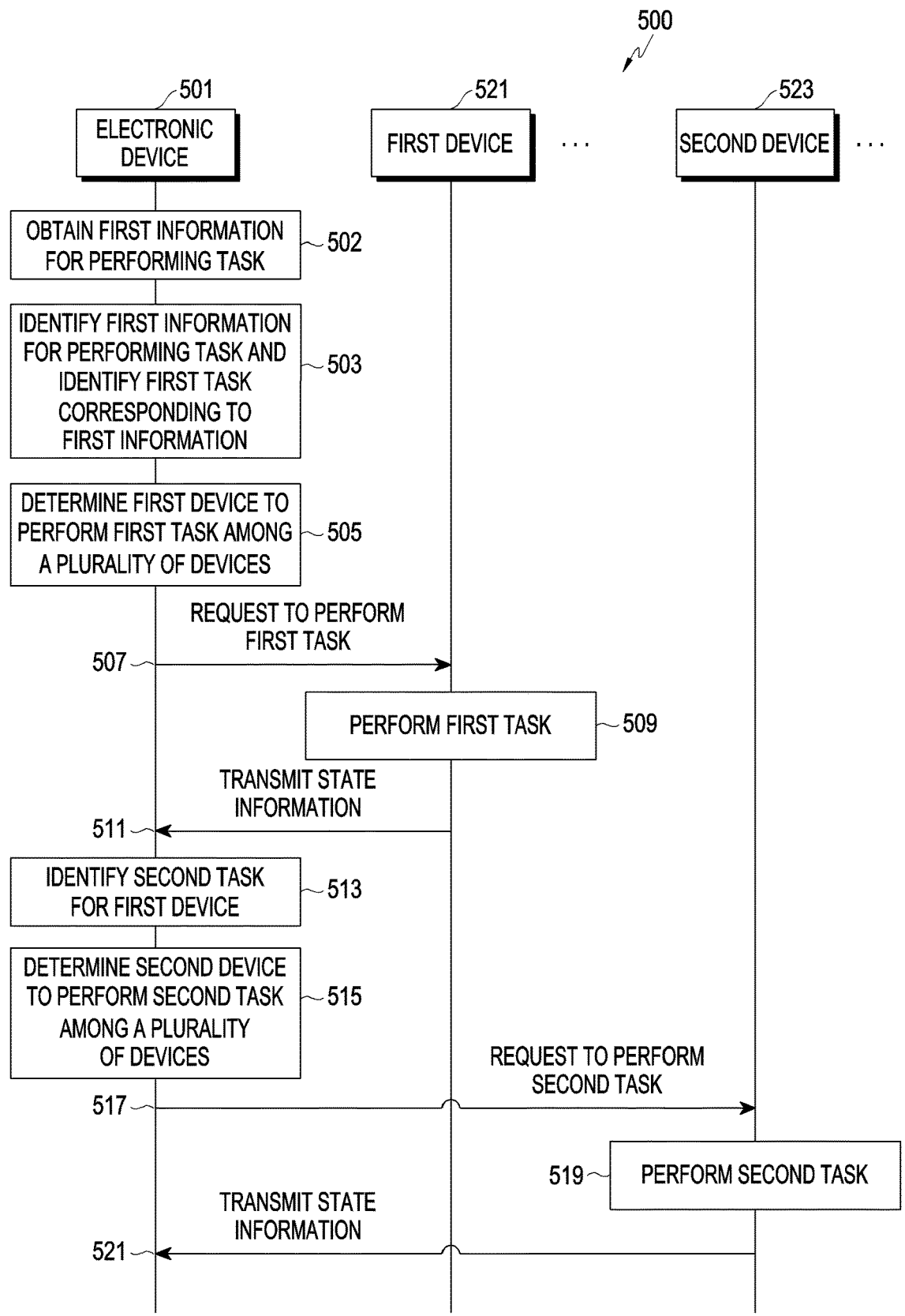
FIG. 5 is a flowchart illustrating operations for determining a device for performing a task by an electronic device according to an embodiment of the disclosure.

FIG. 5 is a flowchart 500 illustrating operations for determining a device for performing a task by an electronic device according to an embodiment of the disclosure.

Referring to FIG. 5, the operations for determining a device for performing a task may include operations 501 to 521. At least one of operations 501 to 521 may be omitted or changed in order or may add other operations.

In operation 502, an electronic device 501 (e.g., the electronic device 101 of FIG. 1, the electronic device 201 of FIG. 2, or the electronic device 301 of FIG. 3) may obtain first information for performing a task.

The electronic device 501 may obtain at least one of user utterance information, state change information about a device in the home, specific time information, state change information about the home, or user location information in the home, as the first information for performing a task. For example, when the first information is user utterance information, the electronic device 501 may issue a user utterance through the microphone of the electronic device or receive a user utterance from a home device connected via communication with the electronic device 501.

In operation 503, the electronic device 501 may identify first information for performing a task and identify a first task corresponding to the first information.

Upon identifying that the first information is user utterance information, the electronic device 501 may parse the user utterance and identify the first task to be performed by the user.

Upon identifying that the first information is state change information about a device in the home, the electronic device 501 may identify a first task (e.g., provide today's weather information) corresponding to the state change (e.g., a change of the air conditioner device from an off state to an on state) in the home device.

Upon identifying that the first information is specific time information, the electronic device 501 may identify a first task (e.g., viewing a TV show) to be performed at the specific time (e.g., 2 PM every Monday).

Upon identifying that the first information is state change information about the home, the electronic device 501 may identify a first task (e.g., outputting information about, e.g., a current change in temperature, humidity, or light intensity in the home) corresponding to the home state change information (e.g., a current change in the temperature, humidity, or light intensity of the home by a reference value or more or less).

Upon identifying that the first information is location information about the user in the home, the electronic device 501 may identify a first task (e.g., outputting user schedule information) corresponding to the location information (e.g., the location information about the user in a specific room) about the user in the home.

In operation 505, the electronic device 501 may determine a first device to perform the first task among the plurality of devices.

The electronic device 501 may identify a plurality of conditions corresponding to the first task among a plurality of conditions set per type of task and determine the first device 521 meeting the plurality of conditions corresponding to the first task among the plurality of devices (e.g., the plurality of devices 221 to 229 of FIG. 2) in the home, managed by the electronic device 501.

The electronic device 501 may determine the first device 521 meeting the plurality of conditions corresponding to the first task by sequentially applying the plurality of conditions corresponding to the first task.

In operation 507, the electronic device 501 may request the first device 521 to perform the first task.

In operation 509, the first device 521 may perform the first task. The first device 521 may perform the first task according to the request from the electronic device 501.

In operation 511, the first device 521 may transmit state information indicating that the first task is performed to the electronic device 501.

The first device 521 may transmit state information indicating that the first task is currently performed by the first device 521 and/or state information indicating that the first task has been completely performed to the electronic device 501.

In operation 513, the electronic device 501 may identify a second task for the first device 521.

Upon receiving the state information indicating that the first task is performed from the first device 521, the electronic device 501 may determine whether to perform the second task and, upon determining to perform the second task, identify the second task for the first device.

The electronic device 501 may identify a plurality of conditions (e.g., the first to third conditions) for determining whether to perform the second task and, when all or at least some of the plurality of conditions are met, determine to perform the second task.

The plurality of conditions may include a first condition where the first task corresponding to the first information for performing a task is irrelevant to terminating the function of the first device (e.g., a user utterance requesting to terminate the function of the first device), a second condition where the number of functions (e.g., a display function, speaker function, or voice support function) that may be performed by the first device is a predetermined number or more based on the configuration information about the first device, and a third condition where the first device is a non-portable device.

Upon determining to perform the second task for the first device, the electronic device 501 may identify a second task for an additional service for the first device performed by the first device 521 and/or a second task for controlling the function of the first device 521.

In operation 515, the electronic device 501 may identify the second device 523 to perform the second task among the plurality of devices.

The electronic device 501 may identify a plurality of conditions corresponding to the second task among a plurality of conditions set per type of task and determine the second device 523 meeting the plurality of conditions corresponding to the second task among the plurality of devices (e.g., the plurality of devices 221 to 229 of FIG. 2) in the home, managed by the electronic device 501.

The electronic device 501 may determine the second device 523 meeting the plurality of conditions corresponding to the second task by sequentially applying the plurality of conditions corresponding to the first task.

In operation 517, the electronic device 501 may request the second device 523 to perform the second task.

In operation 519, the second device 523 may perform the second task. The second device 523 may perform the second task according to the request from the electronic device 501.

In operation 521, the second device 523 may transmit state information indicating that the second task is performed to the electronic device 501.

Upon receiving information about another device selected by the user from the second device 523 capable of providing a service for changing the device for performing the first task, the electronic device 501 may request the first device 521 to terminate performing the first task and request the other device to perform the first task. The electronic device 501 may request the second device 523 to perform the second task for the other device.

Figure 6:
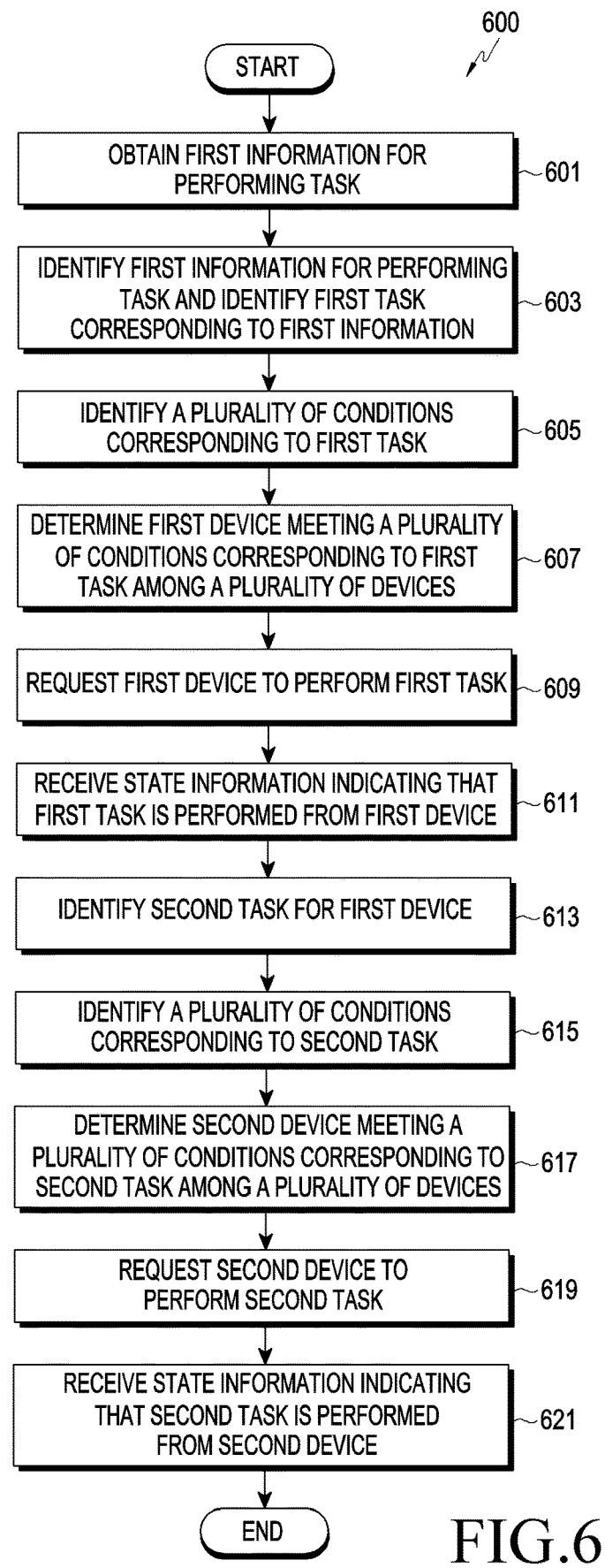
FIG. 6 is a flowchart illustrating operations for determining a device for performing a task by an electronic device according to an embodiment of the disclosure.

FIG. 6 is a flowchart 600 illustrating operations for determining a device for performing a task by an electronic device according to an embodiment of the disclosure.

Referring to FIG. 6, the operations for determining a device for performing a task may include operations 601 to 621. At least one of the operations 601 to 621 may be omitted or changed in order or may add other operations. The operations for determining a device for performing a task may be performed by the electronic device 101 of FIG. 1, the electronic device 201 of FIG. 2, the electronic device 301 of FIG. 3, the processor 320 of FIG. 3, or the electronic device 501 of FIG. 5.

In operation 601, the electronic device 301 may obtain first information for performing a task.

The electronic device 301 may obtain at least one of user utterance information, state change information about a device in the home, specific time information, state change information about the home, or user location information in the home, as the first information for performing a task. For example, when the first information is user utterance information, the electronic device 501 may issue a user utterance through the microphone of the electronic device or receive a user utterance from a home device connected via communication with the electronic device 501.

In operation 603, the electronic device 301 may identify first information for performing a task and identify a first task corresponding to the first information.

Upon identifying that the first information is user utterance information, the electronic device 301 may parse the user utterance and identify the first task to be performed by the user.

Upon identifying that the first information is state change information about a device in the home, the electronic device 301 may identify a first task (e.g., provide today's weather information) corresponding to the state change (e.g., a change of the air conditioner device from an off state to an on state) in the home device.

Upon identifying that the first information is specific time information, the electronic device 301 may identify a first task (e.g., viewing TV show) to be performed at the specific time (e.g., 2 PM every Monday).

Upon identifying that the first information is state change information about the home, the electronic device 301 may identify a first task (e.g., outputting information about, e.g., a current change in temperature, humidity, or light intensity in the home) corresponding to the home state change information (e.g., a current change in the temperature, humidity, or light intensity of the home by a reference value or more or less).

Upon identifying that the first information is location information about the user in the home, the electronic device 301 may identify a first task (e.g., outputting user schedule information) corresponding to the location information (e.g., the location information about the user in a specific room) about the user in the home.

In operation 605, the electronic device 301 may identify a plurality of conditions corresponding to the first task.

The electronic device 601 may identify a plurality of conditions corresponding to the first task among a plurality of conditions set per type of task.

In operation 607, the electronic device 301 may determine a first device meeting the plurality of conditions corresponding to the first task among the plurality of devices.

The electronic device 301 may identify first candidate devices meeting the first condition for the device configuration information for performing the first task among the plurality of devices (e.g., the plurality of devices 221 to 229 of FIG. 2) in the home, managed by the electronic device 301. The electronic device 301 may identify second candidate devices meeting the second condition for the device state information for performing the first task among the plurality of first candidate devices. The electronic device 301 may determine the first device meeting the third condition for the information about the number of devices for performing the first task among the second candidate devices.

In operation 609, the electronic device 301 may request the first device to perform the first task.

In operation 611, the electronic device 301 may receive state information indicating that the first task is performed from the first device.

The electronic device 301 may gather the state information received from the first device, as device information, and store the device information.

In operation 613, the electronic device 301 may identify a second task for the first device.

Upon receiving the state information indicating that the first task is performed, the electronic device 301 may identify a second task for an additional service for the first device performed by the first device and/or a second task for controlling the function of the first device.

Upon receiving the state information indicating that the first task is performed from the first device, the electronic device 301 may determine whether to perform the second task and, upon determining to perform the second task, identify the second task for the first device.

The electronic device 301 may identify a plurality of conditions (e.g., the first to third conditions) for determining whether to perform the second task and, when all or at least some of the plurality of conditions are met, determine to perform the second task. The plurality of conditions may include a first condition where the first task corresponding to the first information for performing a task is irrelevant to terminating the function of the first device (e.g., a user utterance requesting to terminate the function of the first device), a second condition where the number of functions (e.g., a display function, speaker function, or voice support function) that may be performed by the first device is a predetermined number or more based on the configuration information about the first device, and a third condition where the first device is a non-portable device.

Upon determining to perform the second task for the first device, the electronic device 301 may identify a second task for an additional service for the first device performed by the first device and/or a second task for controlling the function of the first device.

In operation 615, the electronic device 301 may identify a plurality of conditions corresponding to the second task.

The electronic device 301 may identify a plurality of conditions corresponding to the second task among a plurality of conditions set per type of task.

In operation 617, the electronic device 301 may determine a second device meeting the plurality of conditions corresponding to the second task among the plurality of devices.

The electronic device 301 may identify first candidate devices meeting the first condition for the user activity information and device configuration information for performing the second task among the plurality of devices (e.g., the plurality of devices 221 to 229 of FIG. 2) in the home, managed by the electronic device 301. The electronic device 301 may identify second candidate devices meeting the second condition for the device state information for performing the second task among the first candidate devices. The electronic device 301 may determine the second device meeting the third condition for the information about the number of devices for performing the second task among the second candidate devices.

In operation 619, the electronic device 301 may request the second device to perform the second task.

In operation 621, the electronic device 301 may receive state information indicating that the second task is performed from the second device.

The electronic device 301 may gather the state information received from the second device, as device information, and store the device information.

Upon receiving information about another device selected by the user from the second device capable of providing a service for changing the device for performing the first task, the electronic device 301 may request the first device to terminate performing the first task and request the other device to perform the first task. The electronic device may request the second device to perform the second task for the other device.

Figure 7:
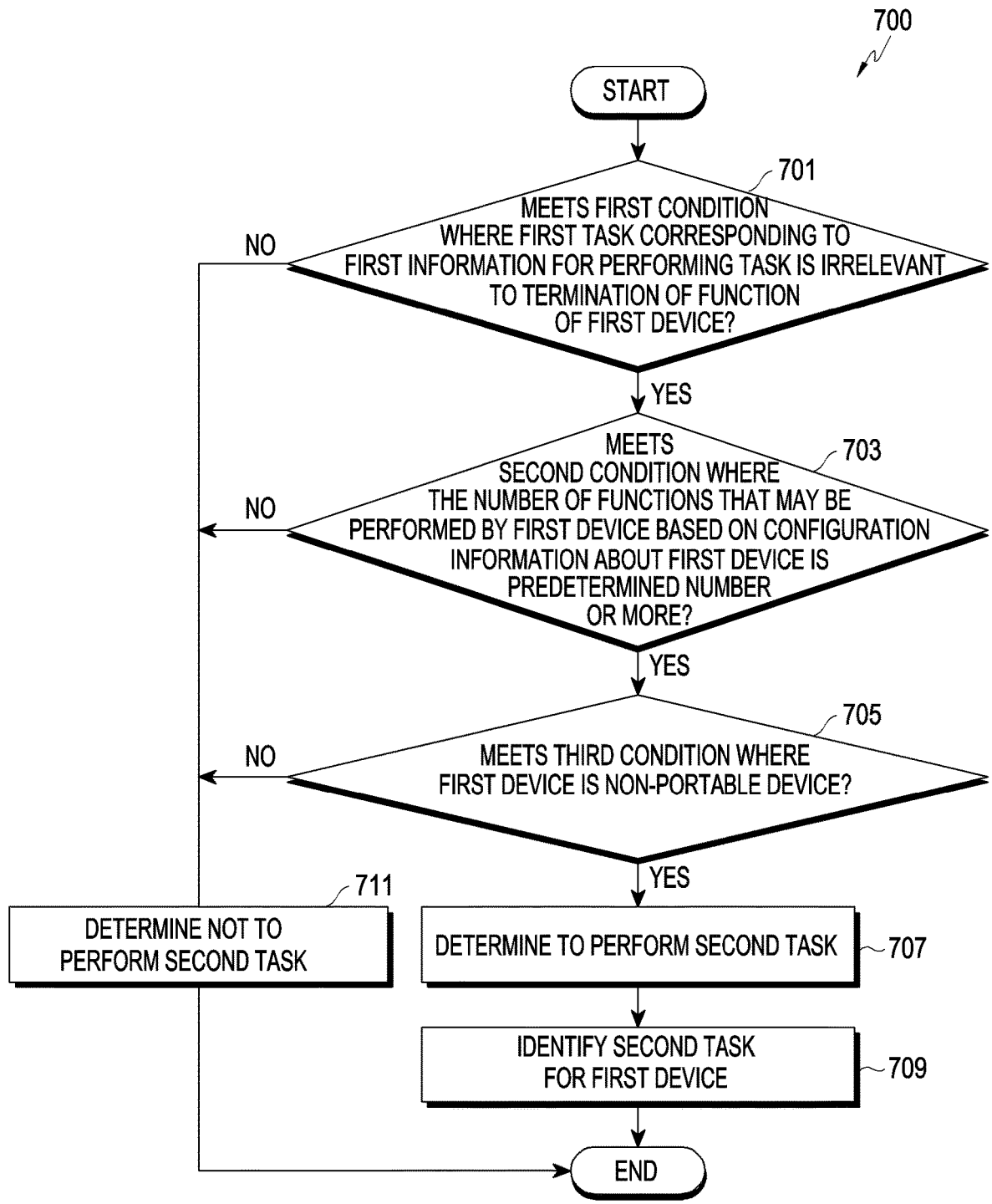
FIG. 7 is a flowchart illustrating operations for determining whether to perform a second task by an electronic device according to an embodiment of the disclosure.

FIG. 7 is a flowchart 700 illustrating the operation of determining whether to perform a second task by an electronic device according to an embodiment of the disclosure. Referring to FIG. 7, the operations for determining a device for performing a task may include operations 701 to 709. At least one of operations 701 to 709 may be omitted or changed in order or may add other operations. The operations for determining a device for performing a task may be performed by the electronic device 101 of FIG. 1, the electronic device 201 of FIG. 2, the electronic device 301 of FIG. 3, the processor 320 of FIG. 3, or the electronic device 501 of FIG. 5.

In operation 701, the electronic device 301 may identify whether, among the plurality of conditions, the first condition where the first task corresponding to the first information for performing a task is irrelevant to the termination of a function of the first device (e.g., a user utterance to request to terminate the function of the first device) is met, so as to determine to perform the second task for the first device.

Upon identifying that the first task is a task to terminate the function (or operation) of the first device in operation 701, the electronic device 301 may determine that the first condition is not met and, in operation 711, determine not to perform the second task.

Upon determining that the first condition is met in operation 701, the electronic device 301 may identify whether, among the plurality of conditions, the second condition where the number of functions (e.g., a display function, speaker function, or voice support function) that may be performed by the first device is a predetermined number or more based on the configuration information about the first device is met in operation 703.

Upon identifying that the number of functions that may be performed by the first device is a predetermined number or less in operation 703, the electronic device 301 may determine that the second condition is not met and, in operation 711, determine not to perform the second task.

Upon determining that the second condition is met in operation 703, the electronic device 301 may identify whether, among the plurality of conditions, the third condition where the first device is a non-portable device is met in operation 705.

Upon identifying that the first device is a portable device (e.g., a watch phone or a smartphone) in operation 705, the electronic device 301 may determine that the third condition is not met and, in operation 711, determine not to perform the second task.

When the third condition is met in operation 705, the electronic device 301 may determine to perform the second task in operation 707.

In operation 709, upon determining to perform the second task, the electronic device 301 may identify the second task for the first device.

Figure 8:
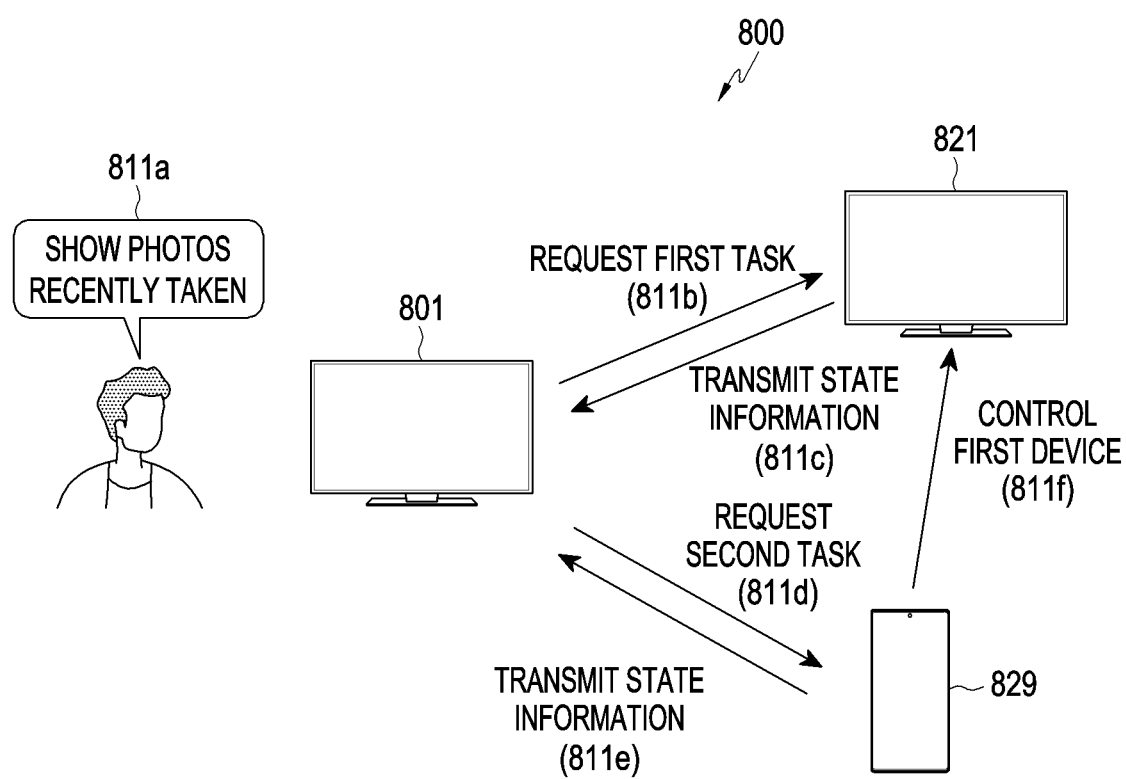
FIG. 8 is a view illustrating operations for determining a device for performing a task by an electronic device according to an embodiment of the disclosure.

FIG. 8 is a view 800 illustrating the operation of determining a device for performing a task by an electronic device according to an embodiment of the disclosure.

Referring to FIG. 8, upon obtaining a user utterance 811*a*, e.g., "Show me photos recently taken," as first information for performing a task, the electronic device 801 (e.g., the electronic device 101 of FIG. 1, the electronic device 201 of FIG. 2, or the electronic device 301 of FIG. 3) may analyze the user utterance and identify a first task of "displaying photos."

The electronic device 801 may identify a first condition where the context of power exists, a second condition where the highest display resolution is preferred, and a third condition where the number of devices to perform the first task is one as a plurality of conditions corresponding to the first task among a plurality of conditions set per type of task.

The electronic device 801 may determine first candidate devices (e.g., devices A, B, D, E, and F) meeting the first condition where the context of power exists among the plurality of devices (e.g., devices A to F) in the home, managed by the electronic device 801, by referring to Table 1 above. The electronic device 801 may determine second candidate devices (e.g., device A>device B=device F>device E) meeting the second condition in order from the highest display resolution to the lowest display resolution and having the context of display among the first candidate devices (e.g., devices A, B, D E, and F). As the second candidate device (e.g., device A) meeting the second condition meets the third condition where the number of devices for performing the first task is one, the electronic device 801 may determine that device A is the first device for performing the first task.

The electronic device 801 may request the first device 821 to perform the first task (811*b*).

The first device 821 may receive recent photos from a server or other devices according to a request from the electronic device 801 and display the recent photos on the display of the first device 821.

The electronic device 801 may receive state information indicating that the first task is performed from the first device 821 (811*c*).

Upon receiving the state information indicating that the first task is performed from the first device 821, the electronic device 801 may identify a second task for performing an additional service for the first task (e.g., displaying recent photos) performed by the first device 821 or a second task for controlling the function of the first device 821. The electronic device 801 may identify a second task to display menu information for providing an additional service (e.g., a photo search service) for the first task (e.g., displaying recent photos) by the first device 821. The electronic device 801 may identify a second task to display menu information for controlling the original function (e.g., TV function) by the first device 821.

The electronic device 801 may identify a first condition where the context of display exists and user activity information exists, a second condition where the maximum volume is preferred, and a third condition where the number of devices for performing the second task is one, as a plurality of conditions corresponding to the second task, among the plurality of conditions set per type of task.

The electronic device 801 may determine first candidate devices (e.g., devices E to F) meeting the first condition where user activity information exists and the context of display is included among the plurality of devices (e.g., devices A to F) in the home, managed by the electronic device 801, by referring to Table 1 above. The electronic device 801 may determine a second candidate device (e.g., device F) meeting the second condition where the maximum volume is preferred among the first candidate devices (e.g., devices E and F). As the second candidate device (e.g., device F) meets the third condition where the number of devices to perform the task is one, the electronic device 801 may determine that the second candidate device (e.g., device F) is the second device 829.

The electronic device 801 may request the second device 829 to perform the second task (811*d*).

The second device 829 may perform the second task (e.g., displaying menu information to provide an additional service (e.g., a photo search service) for the first task (e.g., displaying recent photos) and/or displaying menu information to control the original function (e.g., TV function) by the first device 821) according to a request from the electronic device 801, and then transmit state information related to the second task to the electronic device 801 (811*e*). The user may control the first device 821 using the second device 829 (811*f*).

Figure 9:
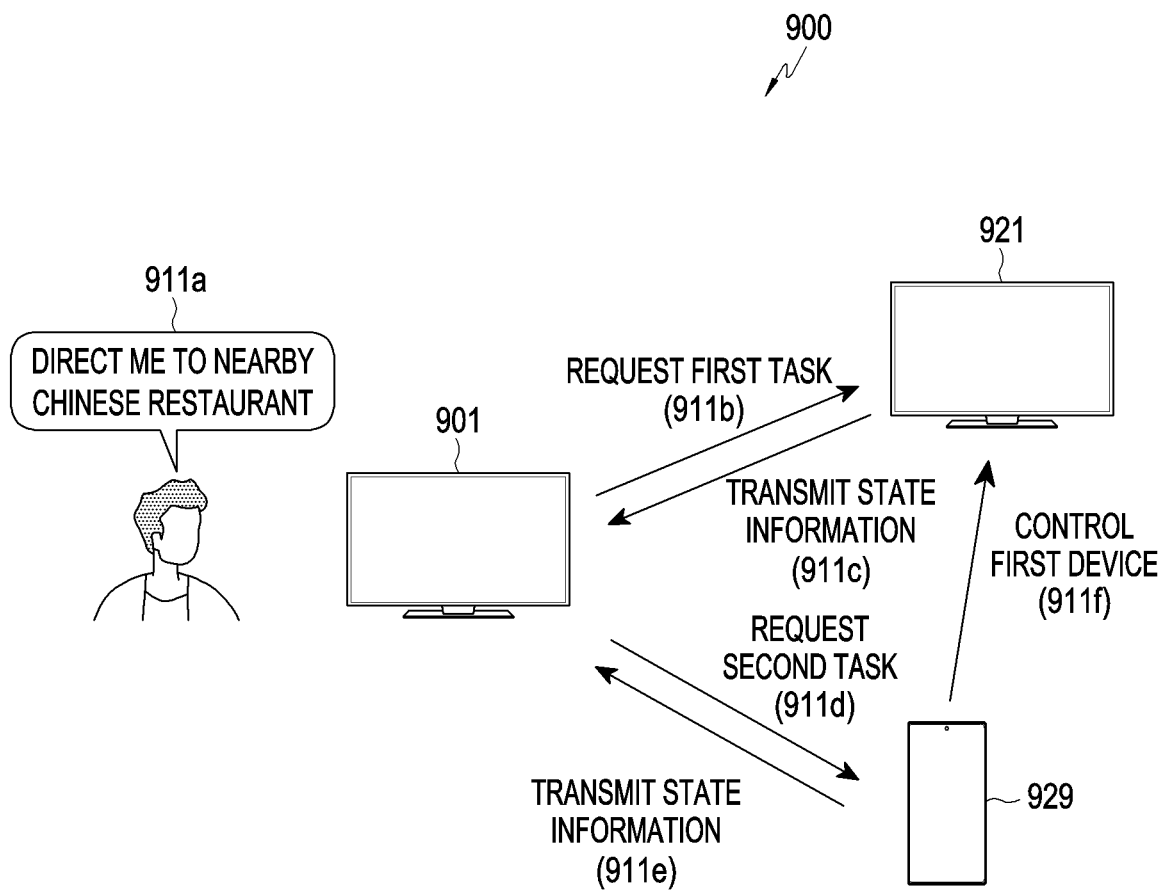
FIG. 9 is a view illustrating operations for determining a device for performing a task by an electronic device according to an embodiment of the disclosure.

FIG. 9 is a view 900 illustrating the operation of determining a device for performing a task by an electronic device according to an embodiment of the disclosure.

Referring to FIG. 9, upon obtaining a user utterance 911*a*, e.g., "Direct me to a nearby Chinese restaurant," as first information for performing a task, the electronic device 901 (e.g., the electronic device 101 of FIG. 1, the electronic device 201 of FIG. 2, or the electronic device 301 of FIG. 3) may analyze the user utterance and identify a first task of "navigation."

The electronic device 901 may identify a first condition where the context of power exists and the voice service is not supportable, a second condition where the maximum volume is preferred, and a third condition where the number of devices for performing the first task is one, as a plurality of conditions corresponding to the first task, among the plurality of conditions set per type of task.

The electronic device 901 may determine first candidate devices (e.g., devices A, B, D, E, and F) meeting the first condition where the context of power exists among the plurality of devices (e.g., devices A to F) in the home, managed by the electronic device 901, by referring to Table 1 above. The electronic device 801 may sort the first candidate devices (e.g., devices A, B, D, E, and F) in order from the highest volume to the lowest volume and determine second candidate devices (e.g., device A>device D=device F>device B>device E) that meet the second condition. As the second candidate device (e.g., device A) meeting the second condition meets the third condition where the number of devices for performing the first task is one, the electronic device 901 may determine that the second candidate device (e.g., device A 921) is the first device.

The electronic device 901 may request the first device 921 to perform the first task (911*b*).

The first device 921 may receive the recent information about the direction to the Chinese restaurant closest to the user's home from a servicer or other devices according to a request from the electronic device 901 and perform the first task of outputting the recent information about the direction to the Chinese restaurant closest to the user's home through the speaker of the first device 921.

The electronic device 901 may receive state information indicating that the first task is performed from the first device 921 (911*c*).

Upon receiving the state information indicating that the first task is performed from the first device 921, the electronic device 901 may identify a second task for performing an additional service for the first task (e.g., directing to the nearest Chinese restaurant) performed by the first device 921 and/or a second task for controlling the function of the first device 921. The electronic device 901 may identify a second task to display menu information for providing an additional service (e.g., an additional search service for the nearest Chinese restaurant) for the first task (e.g., directing to the nearest Chinese restaurant) by the first device 921. The electronic device 901 may identify a second task to display menu information for controlling the original function (e.g., TV function) by the first device 921.

The electronic device 901 may identify a first condition where the context of display exists and user activity information exists, a second condition where the current user activity information indicates the lowest level, and a third condition where the number of devices for performing the second task is one, as a plurality of conditions corresponding to the second task, among the plurality of conditions set per type of task.

The electronic device 901 may determine first candidate devices (e.g., devices E to F) meeting the first condition where current user activity information exists and the context of display exists among the plurality of devices (e.g., devices A to F) in the home, managed by the electronic device 901, by referring to Table 1 above. The electronic device 901 may determine a second candidate device (e.g., device F) meeting the second condition where the current user activity information indicates the lowest level among the first candidate devices (e.g., devices E and F). As the second candidate device (e.g., device F) meets the third condition where the number of devices to perform the task is one, the electronic device 901 may determine that the second candidate device (e.g., device F) is the second device 929.

The electronic device 901 may request the second device 929 to perform the second task (911*d*).

The second device 929 may display menu information corresponding to the second task on the display of the second device according to a request from the electronic device 901.

The electronic device 901 may receive state information indicating that the second task is performed from the second device 929 (911*e*).

The second device 929 may perform the second task (e.g., displaying menu information for providing an additional service (e.g., an additional search service for the nearest Chinese restaurant) for the first task (e.g., directing to the nearest Chinese restaurant) and/or displaying menu information for controlling the original function (e.g., TV function) by the first device 721) according to a request from the electronic device 901, and the user may control the first device 921 using the second device 929 (911*f*).

In addition to the embodiments described above in connection with FIGS. 8 and 9, the electronic device (e.g., the electronic device 301 of FIG. 3) may identify a state change (e.g., a change of the air conditioner device from an off state to an on state) in the home device, as the first information for performing a task and, upon identifying the first task (e.g., providing today's weather information) corresponding to the information about the state change in the home device, perform the first task via the first device (e.g., a speaker) among the plurality of devices in the home.

The electronic device (e.g., the electronic device 301 of FIG. 3) may identify specific time information (e.g., 2 PM every Monday) as the first information for performing a task and, upon identifying the first task (e.g., view TV show) corresponding to the specific time information, perform the first task via the first device (e.g., TV device) among the plurality of devices in the home and perform the second task (e.g., displaying a remote controller menu for controlling the TV) via the second device (e.g., a smartphone).

The electronic device (e.g., the electronic device 301 of FIG. 3) may identify state change information about the home (e.g., a current change in the temperature, humidity, or light intensity of the home by a reference value or more or less) as the first information for performing a task and, upon identifying the first task (e.g., outputting information about the current change in the temperature, humidity, or light intensity of the home) corresponding to the state change information about the home, perform the first task via the first device (e.g., a speaker) among the plurality of devices in the home.

The electronic device (e.g., the electronic device 301 of FIG. 3) may identify the information about the location of the user in the home as the first information for performing a task and, upon identifying the first task (e.g., outputting the user's schedule information) corresponding to the information about the location of the user in the home, perform the first task via the first device (e.g., a speaker) located in a specific room where the user is located among the plurality of devices in the home and perform the second task (e.g., displaying a remote controller menu for controlling the TV) via the second device (e.g., a smartphone).

Figure 10A:
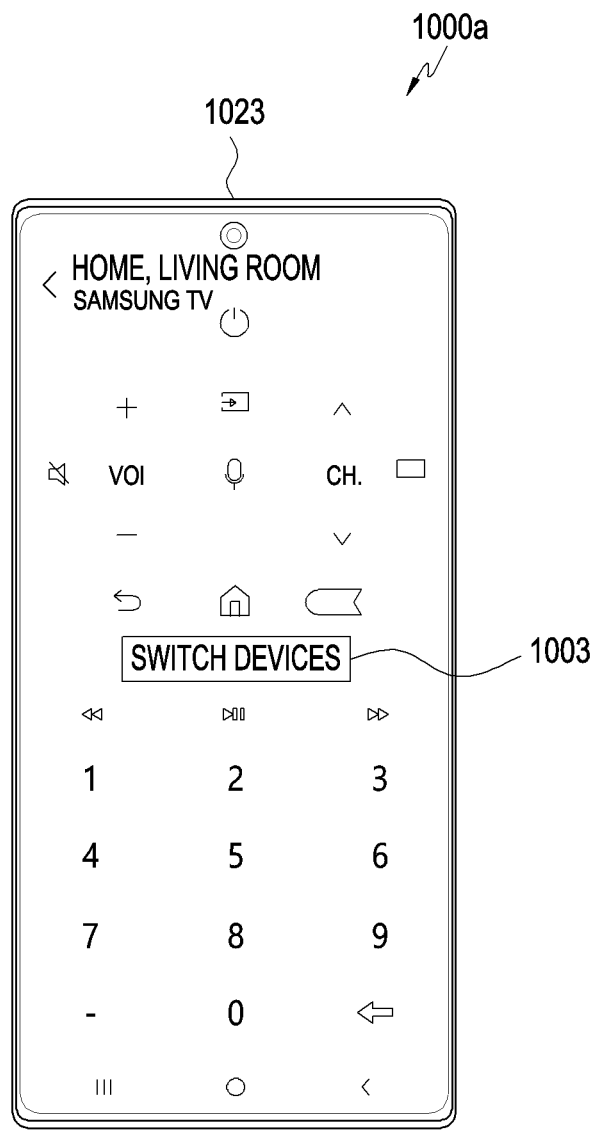
FIGS. 10A and 10B are views illustrating operations for switching devices for performing a task by a second device according to various embodiments of the disclosure.
Figure 10B:
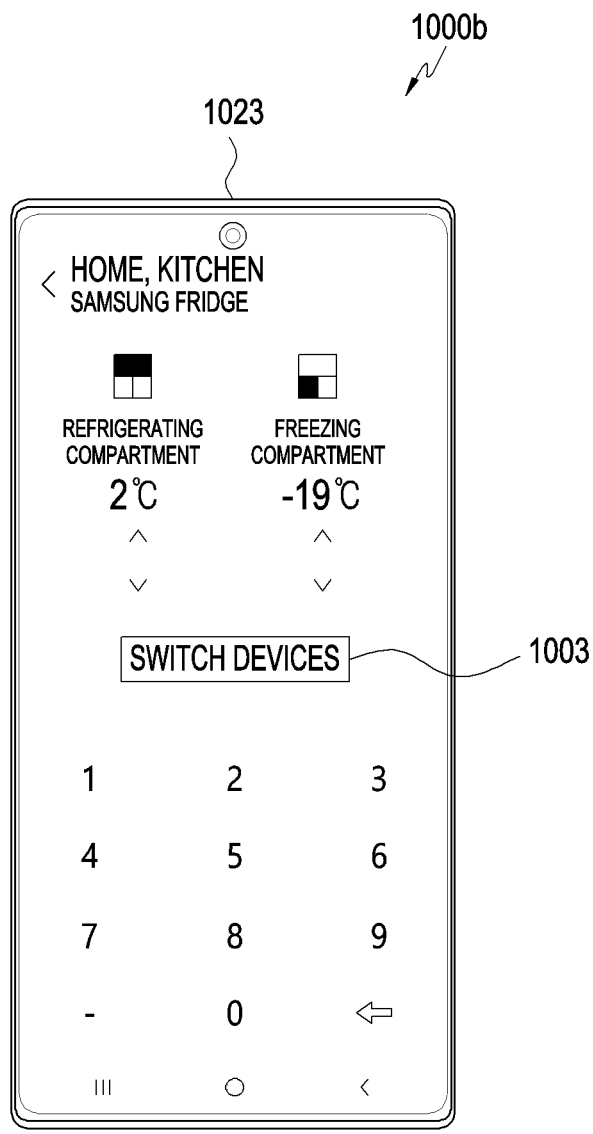

FIGS. 10A and 10B are views 1000a and 1000b illustrating the operation of switching devices for performing a task by a second device according to various embodiments of the disclosure.

Referring to FIG. 10A, when the user selects another device (e.g., a refrigerator) for performing a first task (e.g., displaying the photos taken yesterday) by selecting a device switch menu 1003 for providing a service for changing the device for performing the first task while performing a second task (e.g., displaying a remote controller menu for controlling the TV) for the first device (e.g., a TV device), a second device 1023 (e.g., the smartphone 229 of FIG. 2) may transmit information about the other device (e.g., a refrigerator) selected by the user to an electronic device (e.g., the electronic device 101 of FIG. 1, the electronic device 201 of FIG. 2, or the electronic device 301 of FIG. 3).

Upon receiving the information about the other device (e.g., a refrigerator) selected by the user from the second device 1023, the electronic device may request the first device (e.g., a TV device) to terminate performing the first task (e.g., displaying the photos taken yesterday) and request the other device (e.g., a refrigerator) to perform the first task (e.g., displaying the photos taken yesterday). The electronic device may request the second device 1023 (e.g., a smartphone) to perform the second task (e.g., display a remote controller menu for controlling the refrigerator) for the other device (e.g., a refrigerator).

Referring to FIG. 10B, upon receiving a request for the second task (e.g., displaying a remote controller menu for controlling the refrigerator) for the other device (e.g., a refrigerator) from the electronic device, the second device 1023 (e.g., the smartphone 229 of FIG. 2) may perform the second task (e.g., displaying a remote controller menu for controlling the TV) for the other device (e.g., a refrigerator).

According to an embodiment of the disclosure, a method for determining a device for performing a task by an electronic device may comprise obtaining first information for performing the task, identifying a first task corresponding to the first information, identifying a first device meeting a plurality of conditions corresponding to the first task among a plurality of devices, and requesting the first device to perform the first task via a communication module of the electronic device.

The method may further comprise storing device information gathered from the plurality of devices in a memory of the electronic device.

Identifying the first device may include identifying a plurality of conditions corresponding to the first task among a plurality of conditions set per type of task and determining the first device meeting the plurality of conditions corresponding to the first task among the plurality of devices based on device information gathered from the plurality of devices stored in the memory.

Identifying the first device may include identifying first candidate devices meeting a first condition indicating a constraint condition for device configuration information for performing the first task among the plurality of devices, identifying second candidate devices meeting a second condition indicating a preference condition for device state information for performing the first task among the first candidate devices, and identifying the first device meeting a third condition for information about a number of devices for performing the first task among the second candidate devices.

The method may further comprise gathering state information indicating that the second task is performed, received from the second device, as device information and storing the device information in a memory of the electronic device.

The method may further comprise identifying a second task for the first device, identifying a second device meeting a plurality of conditions corresponding to the second task among the plurality of devices, and requesting the second device to perform the second task via the communication module of the electronic device.

Identifying the second task for the first device may include identifying the second task for performing an additional service for the first task performed by the first device or the second task for controlling a function of the first device.

Identifying the second device may include identifying the second device meeting the plurality of conditions corresponding to the second task among the plurality of devices based on device information gathered from the plurality of devices stored in the memory of the electronic device.

Identifying the second device may include identifying first candidate devices meeting a first condition for user activity information and device configuration information for performing the second task among the plurality of devices, identifying second candidate devices meeting a second condition for device state information for performing the second task among the first candidate devices, and identifying the second device meeting a third condition for information about a number of devices for performing the second task among the second candidate devices.

The method may further comprise gathering state information indicating that the second task is performed, received from the second device, as device information and storing the device information in a memory of the electronic device.

The electronic device according to various embodiments may be one of various types of electronic devices. The electronic devices may include a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute the instructions, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. Some of the plurality of entities may be separately disposed in different components. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device, comprising:
communication circuitry;
one or more processors communicatively coupled to the communication circuitry; and
memory storing one or more computer programs including computer-executable instructions that, when executed by the one or more processors, cause the electronic device to:
obtain first information using user utterance information,
identify a first task corresponding to the first information,
identify a first plurality of conditions corresponding to the first task based on a first type of the first task among a plurality of conditions classified by tasks types,
identify a first device meeting the first plurality of conditions corresponding to the first task among a plurality of devices,
request the first device to perform the first task via the communication circuitry,
receive, from the first device, first state information indicating that the first task performed by the first device has reached a predetermined state,
identify, based on the first state information, a second task for performing an additional service for the first task, wherein the additional service includes displaying information to provide the additional service for the first task and displaying information to control a function by the first device according to a request from the electronic device,
identify a second device meeting a second plurality of conditions corresponding to the second task among the plurality of devices, wherein the second plurality of conditions include a first condition for user activity information and device configuration information for performing the second task, a second condition for device state information for performing the second task, and a third condition for information about a number of devices for performing the second task, and request the second device to perform the second task via the communication circuitry.

2. The electronic device of claim 1, wherein the one or more computer programs further include computer-executable instructions to store device information gathered from the plurality of devices in the memory.

3. The electronic device of claim 1, wherein the one or more computer programs further include computer-executable instructions to:
identify the first device meeting the first plurality of conditions corresponding to the first task among the plurality of devices based on device information gathered from the plurality of devices stored in the memory.

4. The electronic device of claim 1, wherein the one or more computer programs further include computer-executable instructions to:
identify first candidate devices meeting a first condition indicating a constraint condition for device configuration information for performing the first task among the plurality of devices,
identify second candidate devices meeting a second condition indicating a preference condition for device state information for performing the first task among the first candidate devices, and
identify the first device meeting a third condition for information about a number of devices for performing the first task among the second candidate devices.

5. The electronic device of claim 1, wherein the one or more computer programs further include computer-executable instructions to identify the second device meeting the second plurality of conditions corresponding to the second task among the plurality of devices based on device information gathered from the plurality of devices stored in the memory of the electronic device.

6. The electronic device of claim 1, wherein the one or more computer programs further include computer-executable instructions to:
identify first candidate devices meeting the first condition for the user activity information and the device configuration information for performing the second task among the plurality of devices,
identify second candidate devices meeting the second condition for the device state information for performing the second task among the first candidate devices, and
identify the second device meeting the third condition for the information about the number of devices for performing the second task among the second candidate devices.

7. The electronic device of claim 1, wherein the one or more computer programs further include computer-executable instructions to:
gather state information indicating that the first task is performed, received from the first device, as device information, and
store the device information in the memory.

8. The electronic device of claim 1, wherein the one or more computer programs further include computer-executable instructions to:
gather another state information indicating that the second task is performed, received from the second device, as device information, and
store the device information in the memory.

9. A method performed by an electronic device for determining a device for performing a requested task, the method comprising:
obtaining first information by using user utterance information;
identifying a first task corresponding to the first information;
identifying a first plurality of conditions corresponding to the first task based on a first type of the first task among a plurality of conditions classified by tasks types;
identifying a first device meeting the first plurality of conditions corresponding to the first task among a plurality of devices;
requesting the first device to perform the first task via communication circuitry of the electronic device;
receiving, from the first device, first state information indicating that the first task performed by the first device has reached a predetermined state;
identifying, based on the first state information, a second task for performing an additional service for the first task, wherein the additional service includes displaying information to provide the additional service for the first task and displaying information to control a function by the first device according to a request from the electronic device;
identifying a second device meeting a second plurality of conditions corresponding to the second task among the plurality of devices, wherein the second plurality of conditions include a first condition for user activity information and device configuration information for performing the second task, a second condition for device state information for performing the second task, and a third condition for information about a number of devices for performing the second task; and
requesting the second device to perform the second task via the communication circuitry.

10. The method of claim 9, wherein the identifying of the first device includes:
identifying the first device meeting the first plurality of conditions corresponding to the first task among the plurality of devices based on device information gathered from the plurality of devices stored in a memory.

11. The method of claim 9, wherein the identifying of the first device includes:
identifying first candidate devices meeting a first condition indicating a constraint condition for device configuration information for performing the first task among the plurality of devices;
identifying second candidate devices meeting a second condition indicating a preference condition for device state information for performing the first task among the first candidate devices; and
identifying the first device meeting a third condition for information about a number of devices for performing the first task among the second candidate devices.

12. The method of claim 9, wherein the identifying of the second device includes identifying the second device meeting the second plurality of conditions corresponding to the second task among the plurality of devices based on device information gathered from the plurality of devices stored in a memory of the electronic device.

13. The method of claim 9, wherein the identifying of the second device includes:
identifying first candidate devices meeting the first condition for the user activity information and the device configuration information for performing the second task among the plurality of devices;

identifying second candidate devices meeting the second condition for the device state information for performing the second task among the first candidate devices; and identifying the second device meeting the third condition for the information about the number of devices for performing the second task among the second candidate devices.

14. The method of claim 9, further comprising storing device information gathered from the plurality of devices in a memory of the electronic device.

15. The method of claim 9, further comprising:

gathering the first state information indicating that the first task is performed, received from the first device, as device information, and storing the device information in a memory of the electronic device.

16. The method of claim 9, further comprising:

gathering second state information indicating that the second task is performed, received from the second device, as device information, and storing the device information in a memory of the electronic device.

\* \* \* \* \*